United States Patent
Robinson et al.

(10) Patent No.: US 6,504,415 B1
(45) Date of Patent: Jan. 7, 2003

(54) CLOCK DISTRIBUTION FOR IMPROVED JITTER PERFORMANCE IN HIGH-SPEED COMMUNICATION CIRCUITS

(75) Inventors: Moises E. Robinson, Austin, TX (US); Ahmed Younis, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 09/941,968

(22) Filed: Aug. 28, 2001

(51) Int. Cl.$^7$ ................................................. G06F 1/04
(52) U.S. Cl. ..................... 327/291; 327/293; 327/295; 326/96
(58) Field of Search ................................ 327/291, 292, 327/293, 294, 295, 296, 564; 326/93, 96, 86

(56) References Cited

U.S. PATENT DOCUMENTS

| | | | |
|---|---|---|---|
| 4,746,899 A | | 5/1988 | Swanson et al. |
| 5,022,057 A | * | 6/1991 | Nishi et al. ................. 375/119 |
| 5,150,364 A | * | 9/1992 | Negus ......................... 370/112 |
| 5,394,443 A | * | 2/1995 | Byers et al. ................ 375/371 |
| 5,517,147 A | * | 5/1996 | Burroughs et al. .......... 327/295 |
| 5,627,795 A | * | 5/1997 | Nitta ........................... 365/233 |
| 5,943,290 A | | 8/1999 | Robinson et al. |

* cited by examiner

*Primary Examiner*—Tuan T. Lam
*Assistant Examiner*—An T. Luu
(74) *Attorney, Agent, or Firm*—Eduardo E. Drake; H. C. Chan

(57) ABSTRACT

In many electronic systems, it is common to communicate data from a transmitter in one device to a receiver in another. Accurate communications requires use of several matched clock signals. Mismatches in these clock signals cause transmitters to add "jitter" to transmitted data or receivers to be more intolerant of jitter in received signals, increasing the chances of mis-interpreting the data. Accordingly, the inventors devised an exemplary clock-distribution method which entails generating a base set of matched clock signals, deriving at least two separate sets of matched clock signals from the base set, and distributing one of the sets of clock signals to a set of matched components in a circuit and the other set of matched clock signals to a different set of components in the same circuit. The clock signals driving the matched components are isolated from mismatched aspects of the other components, and thus exhibit better matching. This method improves the accuracy of high-speed receivers, transmitters, transceivers, and other communications circuits that use it.

40 Claims, 6 Drawing Sheets

CLOCK DISTRIBUTION FOR IMPROVED JITTER PERFORMANCE IN HIGH-SPEED COMMUNICATION CIRCUITS

TECHNICAL FIELD

The present invention concerns clock distribution circuits and techniques, particularly circuits and techniques related to reducing jitter in mixed-signal communications circuits, such as high-speed transmitters and receivers.

BACKGROUND

In the computer and telecommunications industries, many electronic devices are coupled together to operate as systems. For example, computers are often connected to printers, scanners, cameras, and even other computers. In such systems, a common occurrence is the communication of data between two devices: a sending device and a receiving device.

The sending device generally has the data in the initial form of a set of digital words (sets of ones and zeros). A circuit, known as a transmitter in the sending device, converts each word into a sequence of electrical pulses, and transmits the sequence of pulses based on a clock signal to the receiving device. The receiving device includes a receiver circuit that first determines the timing of the pulses and then identifies each of the pulses in the received signal as a one or zero, enabling it to reconstruct the original set of digital words.

A key part of both the transmitter and the receiver is a clock-generation circuit that generates several matched timing, or clock, signals that oscillate back and forth between a high and a low voltage level at the same frequency. Although the matched clock signals have the same frequency, they are delayed relative to each other so that each signal reaches the high (or low) voltage level at a slightly different time. For example, with three clock signals, the first would reach the high voltage level, then after a delay, the second would reach the high voltage level, and finally after another delay, the third would reach the high voltage level. This same pattern repeats as each clock signal transitions from the high voltage level to the low voltage level, with each signal reaching this low level in sequence, and then moving back to the high voltage level - - - like a series of three traffic lights changing from red to green and back to red, one after the other.

To promote accurate communications between the transmitter and receiver, the delay between the first and second clock signals and the delay between the second and third clocks signals are ideally the same. In the transmitter, the same delay ensures accurate conversion of parallel data to serial data, and in the receiver, the same delay ensures accurate interpretation of a received signal pulse as a one or a zero. However, in practice, there are factors that prevent the delays (or phase relationships) between these clock signals from being the same—in other words, from being perfectly matched.

One of these factors is that each clock signal is conducted to different components of the transmitter and receiver circuitry, and each component has unique electrical traits, such as resistance and capacitance, that affect when each clock signal reaches the high or low voltage level within the component. Voltages within components that have high resistance and capacitance take longer to transition from high to low and low to high than voltages in components that have low resistance and capacitance (assuming all other factors are equal.) As a result, the delay between the clock signals sent to these components vary from what was initially desired. This phenomenon of variant phase relationships among the supposedly matched clock signals causes "jitter" in transmitted data and reduced jitter tolerance in the receiver.

In the past, the jitter and jitter-tolerance reduction stemming from component mismatches (also known as load mismatches) was of less practical significance, because the frequencies of operation were lower and afforded sampling circuits and other types of communications circuits that have a relatively large margin for jitter-related timing errors. However, more recently, the present inventors have recognized that the demands to transfer more data in less time between electronic devices have driven data-transmission frequencies into the gigahertz ranges (a gigahertz is one billion oscillations per second) and thus reduced the margin for these timing errors. At these higher frequencies, any appreciable jitter or jitter-tolerance reduction reduces the accuracy of communications between the transmitter and receiver.

Accordingly, the present inventors have recognized a need for improving the matching of clock signals and thus reducing jitter in transmitted data and improving the jitter tolerance of receivers.

SUMMARY

To address these and other needs, the present inventors devised a unique clock distribution method which improves clock matching and thus can be used in transmitters to reduce jitter and in receivers to improve jitter tolerance. The exemplary scheme entails generating a base set of matched clock signals, deriving at least two separate sets of matched clock signals from the base set, and distributing the separate sets of matched clock signals to respective portions of a circuit. One portion of the circuit has a set of substantially matched subcircuits (components with matched electrical characteristics), each one coupled to receive one of the matched clock signals, and the other portion has no load-matching requirements. The clock signals coupled to the portion having matched loads are more closely matched than those that are coupled to the other portion of the circuit. The portion having matched loads may be used to produce data signals having less jitter, or to process data signals having a higher degree of jitter, thereby improving overall jitter performance of the circuit.

For example, one receiver incorporating the exemplary scheme produces two substantially identical sets of matched clock signals. One of the sets of matched clock signals drives the samplers in a bank of matched phase detectors, and the other set drives the latches and logic gates in the phase detectors. The load characteristics of the latches and logic gates differ significantly from each other and thus cause a certain amount of mismatch in the clock signals driving them, whereas the load characteristics of the samplers across the bank of phase detectors are highly matched (according to fabrication tolerances) and thus preserve matching of their corresponding clock signals. In effect, the clock signals driving the matched samplers are isolated from the mismatched load of the latches and the logic gates. Since the samplers are sensitive to clock matching, and the latch and logic gates are less sensitive, this isolation ultimately allows the receiver to accurately process signals having a greater degree of jitter.

One exemplary transmitter incorporating the scheme produces two substantially identically sets of matched clock signals and includes a parallel-to-serial converter. One of the sets of matched clock signals drives shift registers that can use less stringently matched clock signals, and the other drives multiplexers that require well-matched clock signals. This exemplary transmitter ultimately transmits data signals that have less jitter than conventional designs, and thus facilitates accurate communications.

Other aspects of the invention include transceivers that incorporate the exemplary receiver and/or transmitter. Additional aspects of the invention include related methods and systems. For example, some systems combine one or more of these components with programmable logic devices.

DETAILED DESCRIPTION OF EXEMPLARY EMBODIMENTS

The following detailed description, which references and incorporates the above-identified figures, describes and illustrates one or more specific embodiments of the invention. These embodiments, offered not to limit but only to exemplify and teach, are shown and described in sufficient detail to enable those skilled in the art to implement or practice the invention. Thus, where appropriate to avoid obscuring the invention, the description may omit certain information known to those skilled in the art.

Figure 1:
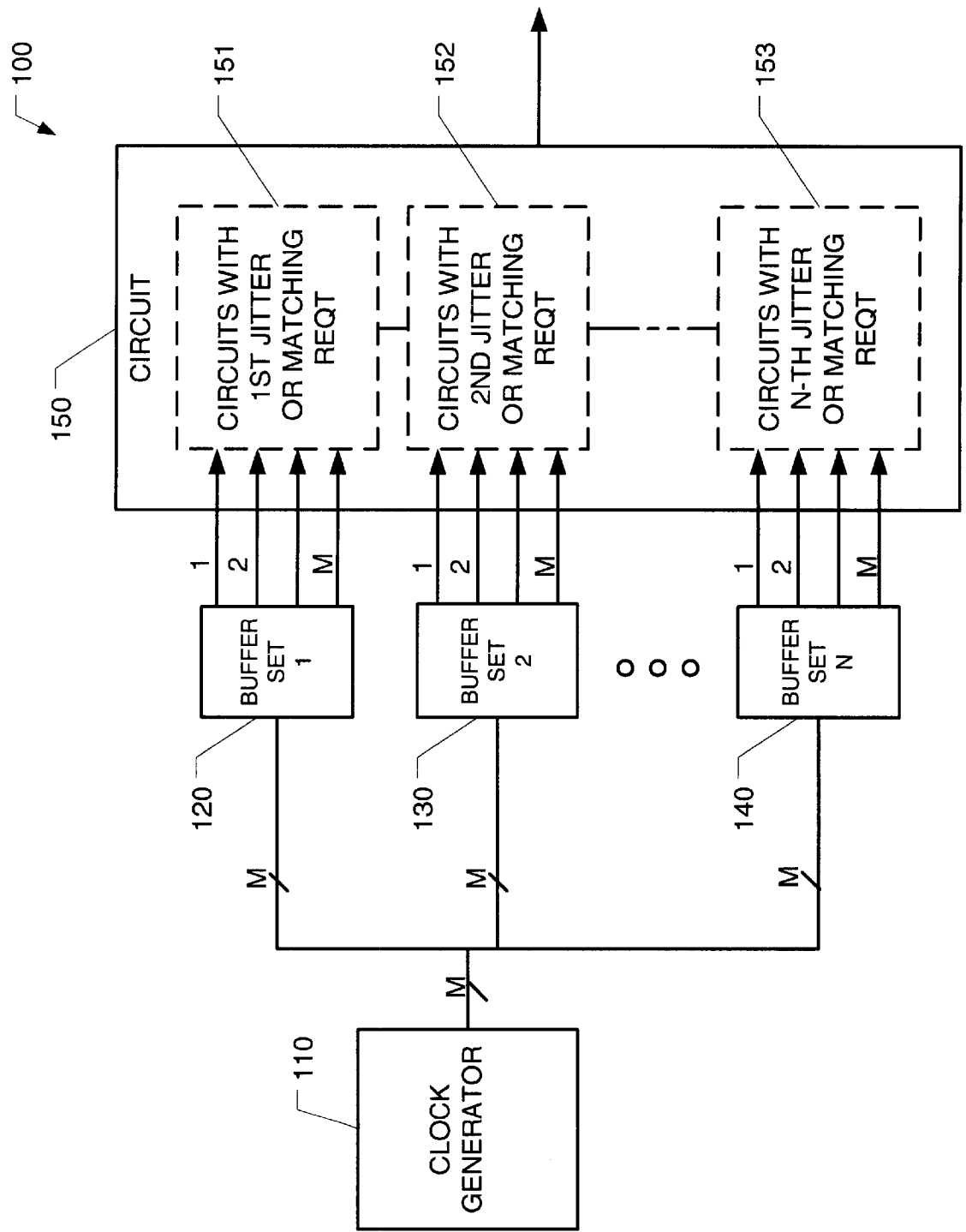
FIG. 1 is a block diagram of an exemplary clock distribution scheme 100.

FIG. 1 shows an exemplary clock distribution scheme 100 incorporating clock-distribution teachings of the present invention. In particular, scheme 100 includes a clock generator 110, buffer sets 120, 130, and 140, and a generic circuit 150. (In this embodiment, all the components are integrated on a common substrate; however, other embodiments place one or more of the generator, buffer sets, and generic circuit on separate substrates.)

Clock generator 110, which can assume the form of any tunable or non-tunable clock generation circuit, such as a ring oscillator or negative-resistance (LC) oscillator, generates a reference set of M multiphasic clock signals. Ideally, each clock signal has a common frequency and a constant phase relation relative to each of the other clock signals. Thus, for example, each i-th clock signal is delayed (i−1)*phi relative to a first one of the clock signals, where phi denotes a constant phase separation.

Buffer sets 120, 130, and 140, which are representative of a set of N buffer sets, each include M buffers (not shown), matched in terms of input impedance and drive capacity. Each buffer (or driver) receives one of the M multiphasic clock signals from clock generator and drives a respective portion of circuit 150. The buffers can be inverting or non-inverting. Other embodiments provide buffer sets with different numbers of buffers depending on the number and timing of clock signals actually needed within the respective portions of circuit 150. The buffers in each set are sized in accord with the load characteristics of its respective portion of circuit 150, meaning that one or more of the buffer sets can comprise buffers with a drive capacity different than that of other buffer sets.

Circuit 150 includes circuit portions 151, 152, and 153, which are collectively representative of N sets of components having respective degrees of jitter tolerance or component matching. Portion 151, which has a first jitter tolerance or degree of component matching, includes one or more components that receive clock signals from buffer set 120. Portion 152, which has a second jitter tolerance or degree of component matching, includes one or more components that receive clock signals from buffer set 130. And, portion 153, which has an N-th jitter tolerance or degree of component matching, includes one or more components that receive clock signals from buffer set 140. Although FIG. 1 suggests that the components in each portion are physically grouped together in the circuit, this is not a necessary condition; indeed, the components may be distributed throughout a given circuit and potentially across different devices.

In the exemplary embodiment, at least one of the circuit portions includes a set of substantially matched components—that is, components matched in terms of load impedance—to reduce mismatch in the clock signals driving these components and thus reduce jitter or improve jitter tolerance depending on the specific application. The other circuit portions need not include matched components, but are grouped with an understanding of the impedance variations across the grouped components and the impact this variation will have on mismatch of the corresponding clock signals. In some cases, the components in these other groups may tolerate a relatively high degree of mismatch among the clock signals.

In some other embodiments, two or more circuit portions comprise respective sets of matched components. For example, one circuit portion can comprise a set of matched A-type components, and another circuit portion can comprise a set of matched B-type components. Alternatively, both circuit portions can comprise respective sets of matched A-type components. Thus, the present invention encompasses a multitude of practical embodiments.

Exemplary Phase-Detection Circuit

Figure 2:
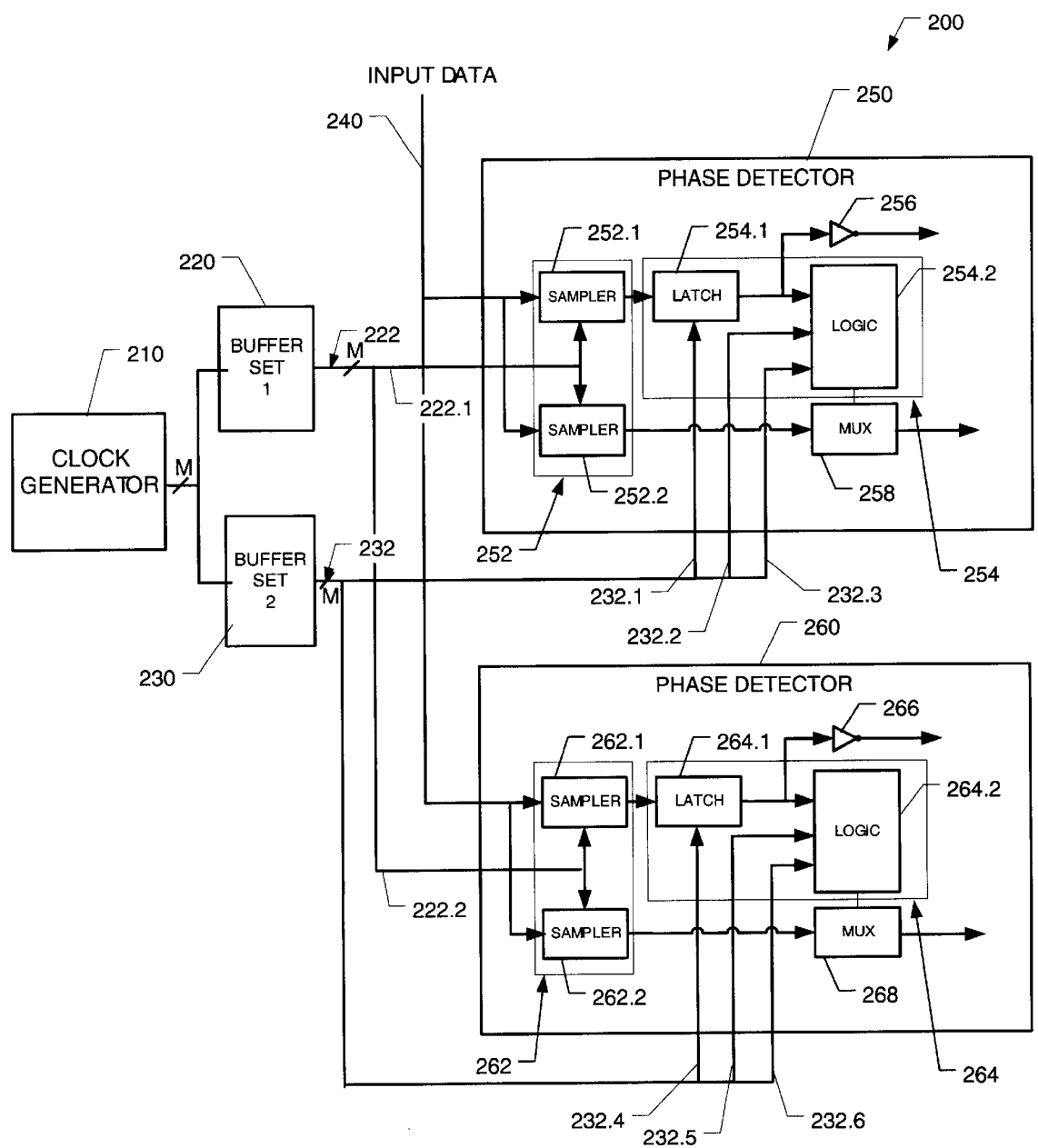
FIG. 2 is a block diagram of an exemplary phase-detection circuit 200 incorporating clock-distribution scheme 100.

FIG. 2 shows an exemplary phase-detection circuit 200 that incorporates one variant of the exemplary clock distribution scheme. Phase-detection circuit 200 includes a clock generator 210, buffer sets 220 and 230, input data line 240, and matched phase detectors 250 and 260.

Clock generator 210 generates a set of M multiphasic clock signals, with each i-th clock signal delayed (i−1)*phi relative to a first one of the clock signals, where phi denotes a constant phase separation. (In some embodiments, phi is 360·/M.) Clock generator 210 can assume the form of any tunable or non-tunable clock generation circuit, such as a ring oscillator or negative-resistance (LC) oscillator. Thus, the present invention is not limited to any particular form of clock generator.

Buffer sets 220 and 230 each include M buffers or drivers (not shown). In this exemplary embodiment, the M buffers in buffer set 220 are substantially identical CMOS buffers, and the M buffers in buffer set 230 are substantially identical buffers, with the buffers in buffer set 220 having a different driving capacity than those of buffer set 230. However, in other embodiments, the buffers in each set have substantially similar driving capacities. Additionally, the exemplary embodiment implements buffer sets 220 and 230 by splitting the field-effect transistors used to form a single conventional buffer set into two parts, with each part sized according to its portion of the load.

Each buffer set drives respective portions of phase detectors 250 and 260, which are generally representative of a set of N phase detectors. In particular, buffer set 220 drives a sampler portion 252 of phase detector 250 and a sampler portion 262 of phase detector 260. And, buffer set 230 drives a latch-and-logic portion 254 of phase detector 250 and a latch-and-logic portion 264 of phase detector 260.

More particularly, phase detectors 250 and 260, both of which sample and decode respective data bits on input data line 240 according to conventional principles, include respective sampler portions 252 and 262, latch-and-logic portions 254 and 264, inverters 256 and 266, and multiplexers 258 and 268. Sampler portions 252 and 262 include respective matched sampler circuits 252.1 and 252.2 and 262.1 and 262.2, all of which receive clock signals from buffer set 220 via clock-signal bus 222. Sampler circuits 252.1 and 252.2 receive a clock signal conducted by a clock-signal line 222.1 (of bus 222), and sampler circuits 262.1 and 262.2 receive a clock signal conducted by a clock-signal line 222.2.

Latch-and-logic circuits 254 and 264 receive clock signals from buffer set 230 via a clock-signal bus 232, which includes clock-signal lines 232.1, 232.2, ..., 232.6. Latch-and-logic circuits 254 and 264 include respective latches 254.1 and 264.1 and respective logic blocks 254.2 and 264.2. Latches 254.1 and 264.1 receive respective clocks signals conducted by clock-signal lines 232.1 and 232.4; logic block 254.2 receives clock signals conducted by clock-signal lines 232.2 and 232.3; and logic block 264.2 receives clock signals conducted by clock-signal lines 232.5 and 232.6.

Driving the sampler circuits using a separate set of buffers from those used to drive the latch-and-logic circuits effectively isolates the buffers serving the sampler circuits from the different load characteristics of the latch-and-logic circuits. This ultimately improves the jitter tolerance of the receiver relative to that exhibited in conventional receivers that use the same set of buffers to drive both the samplers and the latch-and-logic circuits.

One variant of this exemplary receiver includes three buffer sets, instead of two. The first buffer set drives the samplers; the second drives the latches; and the third drives the logic blocks, thereby reducing mismatches in the clock signals serving the latches as well as those serving the logic blocks. However, the third buffer set requires a third set of bus lines; thus, one should weigh the benefits of further improved clock matching in the latches and logic circuit versus the cost of the extra buffers and bus lines.

Exemplary Receiver Incorporating Phase-Detection Circuit 200

Figure 3:
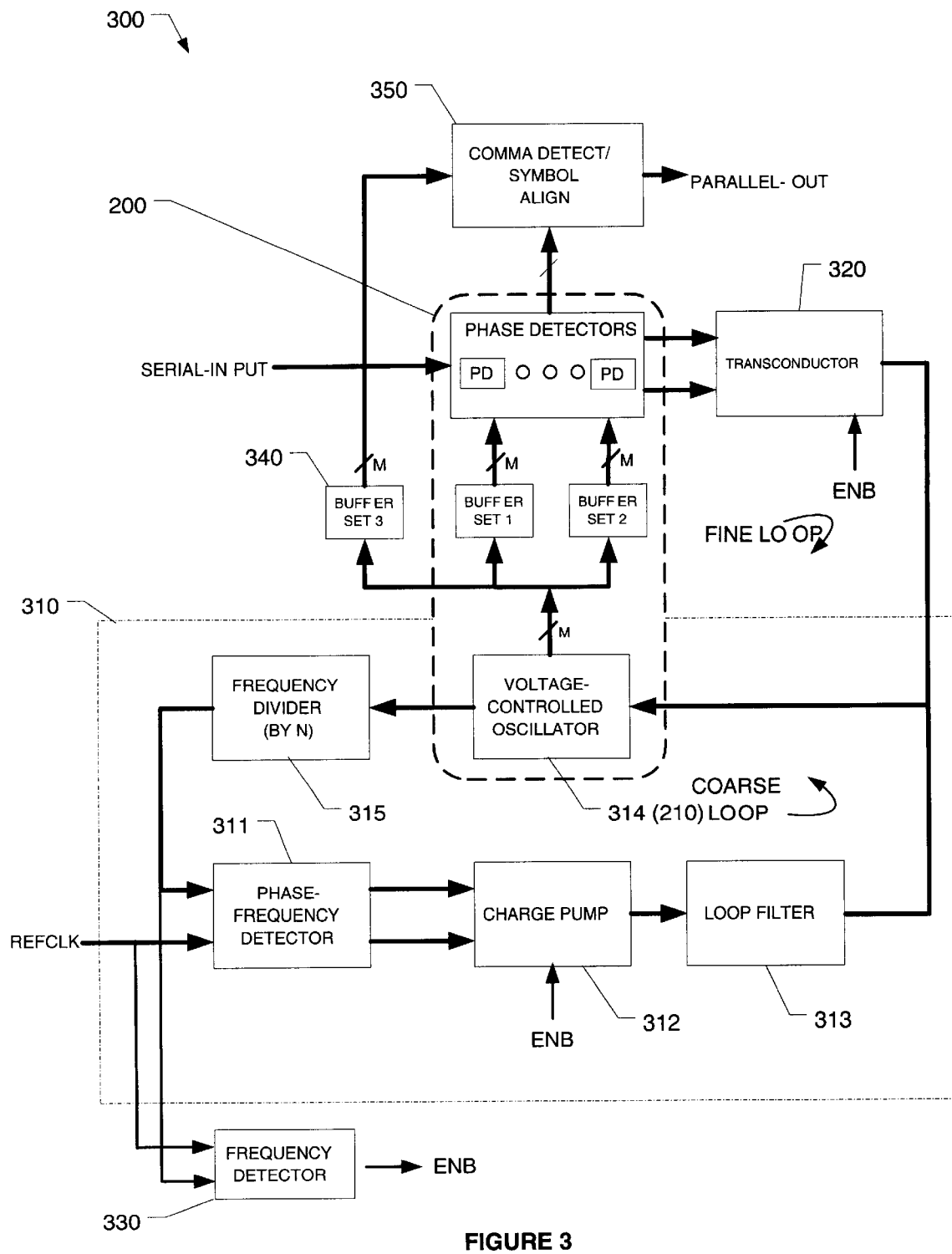
FIG. 3 is a block diagram of an exemplary receiver 300 incorporating phase-detection circuit 200.

FIG. 3 shows an exemplary receiver 300 which incorporates exemplary phase-detection circuit 200 and operates according to known principles. In addition to phase-detection circuit 200, receiver 300 includes a coarse phase-locked loop 310, a transconductor 320, a frequency detector 330, a buffer set 340, a comma-detection-and-symbol-alignment block 350, a reference-clock input REFCLK, a serial-data input SERIAL-INPUT, and a parallel-data output PARALLEL-OUT. (There are three buffer sets in receiver 300, counting the two buffer sets in phase-detection circuit 200.) Phase-locked loop 310 includes a phase-frequency detector 311, a charge pump 312, a loop filter 313, a voltage controlled oscillator 314, and a frequency divider 315. (To signify that voltage-controlled oscillator 314 serves the function of clock generator 210 in phase-detection circuit 200, the oscillator is referenced parenthetically using reference number 210.)

Exemplary Transmitter

Figure 4:
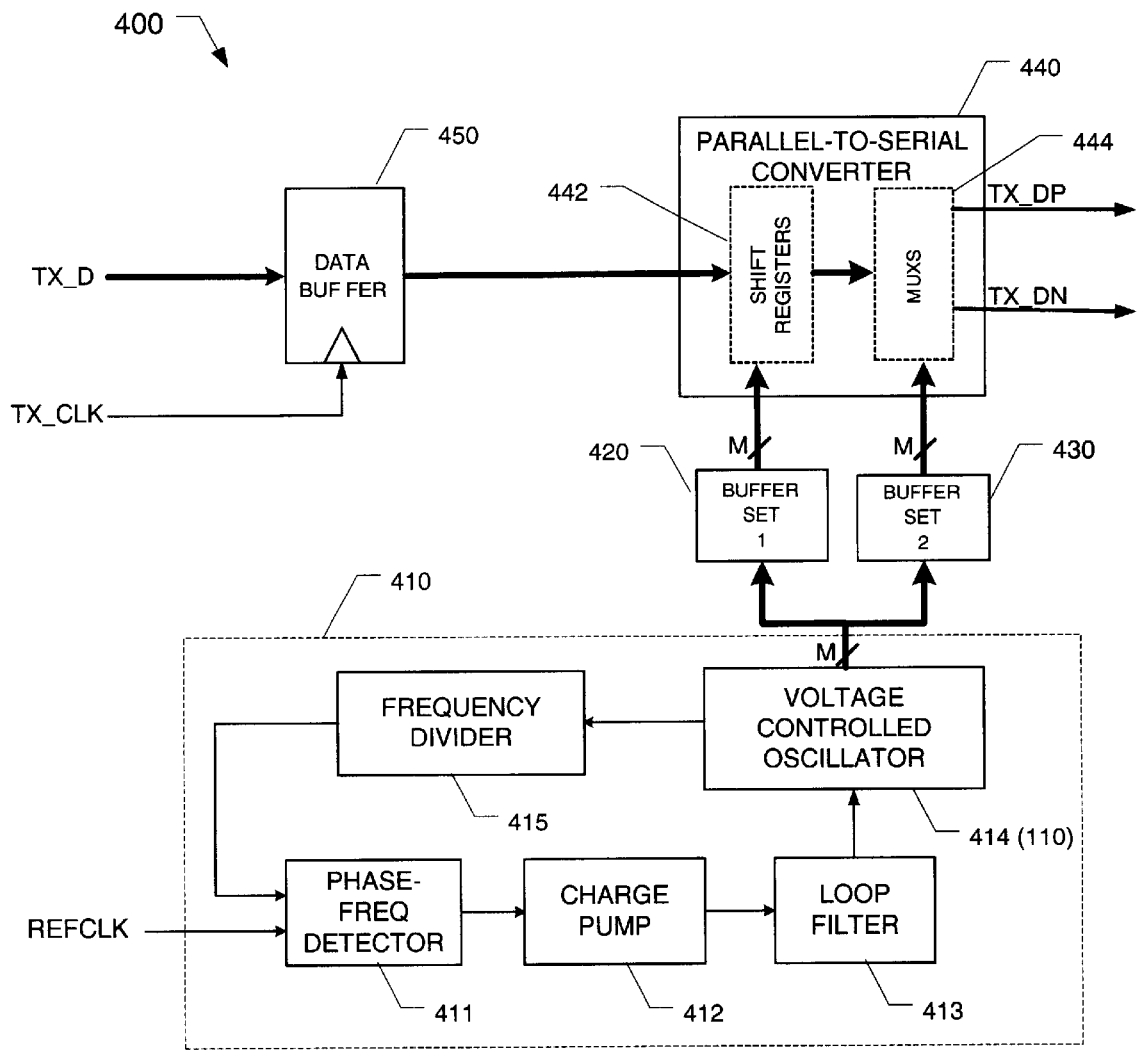
FIG. 4 is a block diagram of an exemplary transmitter 400 incorporating clock distribution scheme 100.

FIG. 4 shows an exemplary transmitter 400 which incorporates one variant of the exemplary clock distribution scheme in FIG. 1 and operates according to known principles.

Transmitter 400 includes a phase-locked loop 410, buffer sets 420 and 430, parallel-to-serial converter 440, data buffer 450, parallel data input TX_D, transmitter clock input TX_CLK, and reference-clock input REFCLK.

Phase-locked loop 410, which receives a signal from reference-clock input REFCLK, includes a phase-frequency detector 411, a charge pump 412, a loop filter 413, a voltage-controlled oscillator 414, and a frequency divider 415. (To signify that voltage-controlled oscillator 414 serves the function of clock generator 110 in distribution scheme 100, the oscillator is referenced parenthetically using reference number (110)).

Buffer sets 420 and 430 each of which includes M buffers or drivers (not shown). In this exemplary embodiment, the M buffers in buffer set 420 are substantially identical CMOS buffers, and the M buffers in buffer set 430 are substantially identical buffers, with the buffers in buffer set 420 having a different driving capacity than those of buffer set 430. However, in other embodiments, the buffers in each set have substantially similar driving capacities. Additionally, the exemplary embodiment implements buffer sets 420 and 430 by splitting the field-effect transistors used to form a single conventional buffer set into two parts, with each part sized according to its portion of the load.

Buffer sets 420 and 430 drive respective portions of parallel-to-serial converter 440. Specifically, buffer set 420 drives shift registers 442, and buffer set 430 drives output multiplexers 444. In this exemplary embodiment, shift registers 442 are not matched to each other, whereas output multiplexers 444 are substantially matched. However, in other embodiments, the shift registers (or other data-storage elements) are substantially matched.

Data buffer 450 is coupled to receive parallel data from parallel data input TX_D and to receive transmitter clock input TX_CLK. Buffer 450 outputs parallel data to parallel-to-serial converter 440.

Exemplary Field-Programmable Integrated Circuit

Figure 5:
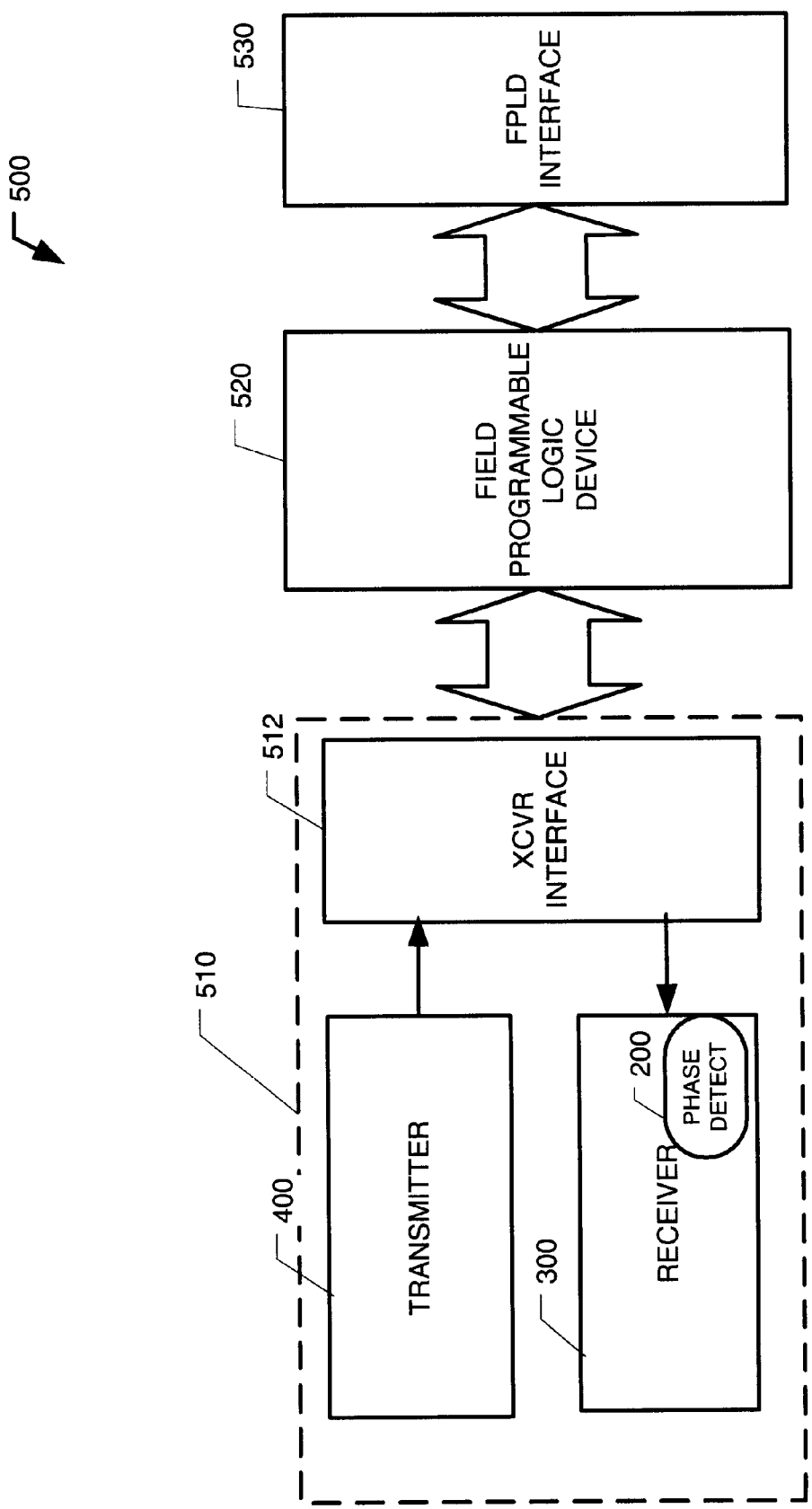
FIG. 5 is a block diagram of an exemplary programmable integrated circuit 500 incorporating the exemplary receiver of FIG. 3 and the exemplary transmitter of FIG. 4.

FIG. 5 shows a block diagram of an exemplary field-programmable integrated circuit 500, which includes a transceiver 510, a field-programmable logic device (FPLD) 520, such as a field-programmable gate array (FPGA), and a FPLD interface 530. Transceiver 510 includes exemplary receiver 300 (of FIG. 3), exemplary transmitter 400 (of FIG. 4), and transceiver (XCVR) interface 512. Although not shown for clarity of illustration, various embodiments of logic device 520 include one or more individually and collectively configurable logic blocks, as well as an on-board processor and memory, which facilitate configuration of the device to perform desirable signal and data-processing functions. FPLD Interface 530 provides conventional communications and program-support capabilities.

Exemplary System

Figure 6:
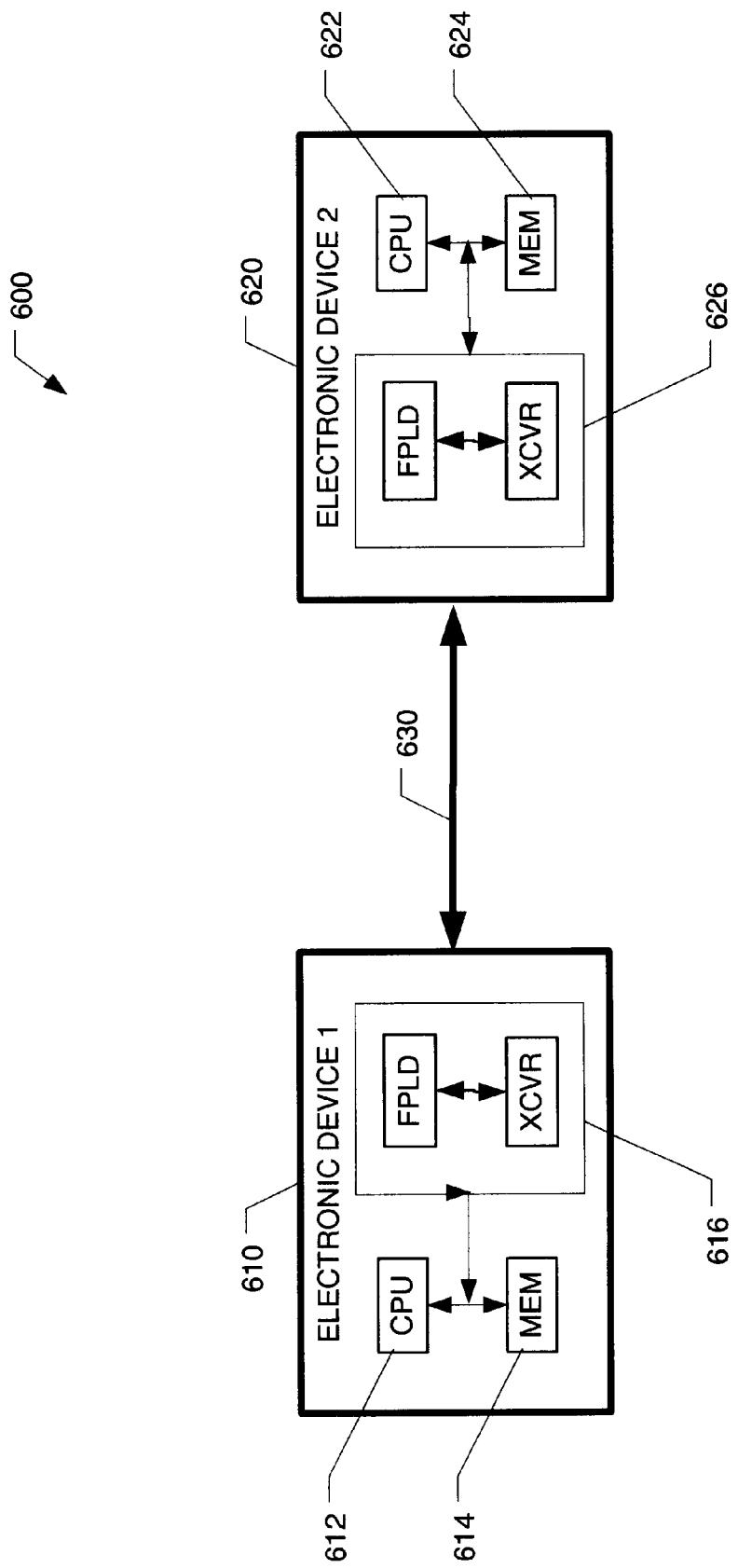
FIG. 6 is a block diagram of an exemplary system 600 incorporating the programmable integrated circuit of FIG. 5.

FIG. 6 shows an exemplary system 600 including two or more electronic devices that incorporate field-programmable integrated circuit 500 of FIG. 5. In particular, system 600 includes electronic devices 610 and 620 and a communications link 630. Devices 610 and 620 include respective processors 612 and 622, memories 614 and 624, and integrated programmable circuits 616 and 626. Circuits 616 and 626 incorporate the teachings of integrated circuit 500 in FIG. 5 and thus provide devices 610 and 620 with capability for communicating over communications link 630 to each other (or to one or more other suitably equipped devices.) Communications link 630, which can be a wireline or wireless connection, carries voice, analog, and/or digital data, including programming commands and instructions.

Devices 610 and 620 can assume a wide variety of forms. For example, in various embodiments, one or both of the devices are a computer, monitor, mouse, key board, printer, scanner, fax machine, network communications device, personal digital assistant, cordless telephone, headset, mobile telephone, vehicle, appliance, entertainment equipment, and industrial controller. Indeed, virtually any device that currently communicates with another device wirelessly or via a wireline connection, that would be more useful with such communication, or that could benefit from better matching of clocks signals incorporate teachings of the present invention.

Conclusion

In furtherance of the art, the present inventors have presented a unique clock distribution method which reduces clock mismatch. The exemplary scheme entails generating a base set of matched clock signals, deriving at least two separate sets of matched clock signals from the base set, and distributing one of the sets of matched clock signals to a set of substantially matched components in a circuit and the other set of matched clock signals to a different set of components in the same circuit. In effect, the clock signals driving the matched components are isolated from any load mismatches in the other components, reducing mismatches in the one set of clock signals. The scheme ultimately improves the performance of phase-detection circuits, receivers, transmitters, transceivers, programmable integrated circuits, electronic devices, and systems that use it.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A circuit comprising:
   clock-generation means for generating a reference set of matched clock signals, with each clock signal in the reference set being delayed a corresponding multiple of a nominal delay period relative to a given one of the clock signals;
   a first set of buffers having a set of clock inputs coupled to receive the reference set of matched clock signals and having a set of clock outputs for providing a set of first clock signals based on the reference set of matched clock signals;
   a second set of buffers having a set of clock outputs coupled to receive the reference set of matched clock signals and having a set of clock outputs for providing a set of second clock signals based on the reference set of matched clock signals; and
   a first subcircuit including:
      a first component having a clock input coupled to receive a first one of the first clock signals; and
      a second component having a clock input coupled to receive a first one of the second clock signals; and
   a second subcircuit substantially identical to the first subcircuit and including:
      a third component substantially identical to the first component and having a clock input coupled to receive a second one of the first clock signals; and
      a fourth component having a clock input coupled to receive a second one of the second clock signals.

2. The circuit of claim 1, wherein the second and fourth components are substantially identical to each other, and different from the first and third components.

3. The circuit of claim 1, wherein the first and third components are samplers.

4. The circuit of claim 1, wherein the second and fourth components each comprise a latch or a logic circuit.

5. The circuit of claim 1, further comprising:
   a third subcircuit substantially identical to the first subcircuit and including:
      a fifth component substantially identical to the first component and having a clock input coupled to receive a third one of the first clock signals; and
      a sixth component having a clock input coupled to receive a third one of the second clock signals.

6. A phase-detection circuit comprising:
   a data-input node for receiving data;
   a first set of buffers having a set of first clock outputs for providing a first set of clock signals based on a reference set of matched clock signals;
   a second set of buffers having a set of second clock outputs for providing a second set of clock signals based on the reference set of matched clock signals; and
   first and second substantially identical phase detectors,
   with the first phase detector including:
      a first sampler having a data input coupled to the data-input node and a clock input coupled to a first one of the first clock outputs; and
      a first component having a data input coupled to an output of the first sampler and a clock input coupled to a first one of the second clock outputs; and
   with the second phase detector including:
      a second sampler having a data input coupled to the data-input node and a clock input coupled to a second one of the first clock outputs; and
      a second component having a data input coupled to an output of the second sampler and a clock input coupled to a second one of the second clock outputs.

7. The phase-detection circuit of claim 6, wherein the first phase detector further comprises:
   another sampler coupled to the data-input node and to the first one of the first clock outputs.

8. The phase-detection circuit of claim 6, wherein each of the first and second components comprise a latch or a logic circuit.

9. The phase-detection circuit of claim 6, further comprising a voltage-controlled oscillator coupled to the first and second sets of buffers.

10. A receiver comprising a phase-detection circuit that comprises:
    a data-input node for receiving data;
    a first set of buffers having a set of first clock outputs for providing a first set of clock signals based on a reference set of matched clock signals;
    a second set of buffers having a set of second clock outputs for providing a second set of clock signals based on the reference set of matched clock signals; and
    first and second substantially identical phase detectors, with the first phase detector including:
  a first sampler having a data input coupled to the data-input node and a clock input coupled to a first one of the first clock outputs; and
  a first component having a data input coupled to an output of the first sampler and a clock input coupled to a first one of the second clock outputs; and
with the second phase detector including:
  a second sampler having a data input coupled to the data-input node and a clock input coupled to a second one of the first clock outputs; and
  a second component having a data input coupled to an output of the second sampler and a clock input coupled to a second one of the second clock outputs.

11. A programmable integrated circuit comprising:
a receiver; and
at least one field-programmable logic device coupled to the receiver;
wherein the receiver comprises a phase-detection circuit comprising:
  a data-input node for receiving data;
  a first set of buffers having a set of first clock outputs for providing a first set of clock signals based on a reference set of matched clock signals;
  a second set of buffers having a set of second clock outputs for providing a second set of clock signals based on the reference set of matched clock signals; and
  first and second substantially identical phase detectors, with the first phase detector including:
    a first sampler having a data input coupled to the data-input node and a clock input coupled to a first one of the first clock outputs; and
    a first component having a data input coupled to an output of the first sampler and a clock input coupled to a first one of the second clock outputs; and
  with the second phase detector including:
    a second sampler having a data input coupled to the data-input node and a clock input coupled to a second one of the first clock outputs; and
    a second component having a data input coupled to an output of the second sampler and a clock input coupled to a second one of the second clock outputs.

12. A system comprising:
a programmable integrated circuit; and
a processor coupled to the programmable integrated circuit;
wherein the programmable integrated circuit comprises a receiver and at least one field-programmable logic device coupled to the receiver;
wherein the receiver comprises a phase-detection circuit comprising:
  a data-input node for receiving data;
  a first set of buffers having a set of first clock outputs for providing a first set of clock signals based on a reference set of matched clock signals;
  a second set of buffers having a set of second clock outputs for providing a second set of clock signals based on the reference set of matched clock signals; and
  first and second substantially identical phase detectors, with the first phase detector including:
    a first sampler having a data input coupled to the data-input node and a clock input coupled to a first one of the first clock outputs; and
    a first component having a data input coupled to an output of the first sampler and a clock input coupled to a first one of the second clock outputs; and
  with the second phase detector including:
    a second sampler having a data input coupled to the data-input node and a clock input coupled to a second one of the first clock outputs; and
    a second component having a data input coupled to an output of the second sampler and a clock input coupled to a second one of the second clock outputs.

13. A phase-detection circuit comprising:
  a clock generator having a set of M outputs for providing a reference set of M matched clock signals, with $M>=2$;
  a first set of M buffers coupled to the set of M first outputs for providing a set of M first clock signals;
  a second set of M buffers coupled to the set of M outputs for providing a set of M second clock signals; and
  a first phase detector including first and second samplers and a first latch, with the first sampler having an input for receiving a first data signal and a clock input coupled to receive a first one of the first clock signals, the second sampler having an input for receiving the first data signal and a clock input coupled to receive the first one of the first clock signals, the first latch having a data input coupled to an output of the first sampler and a clock input coupled to receive a first one of the second clock signals.

14. The phase detection circuit of claim 13, further comprising:
  a second phase detector including third and fourth samplers and a second latch, with the third sampler having an input for receiving the first data signal and a clock input coupled to receive a second one of the first clock signals, the fourth sampler having an input for receiving the data signal and a clock input coupled to receive the second one of the first clock signals, the second latch having a data input coupled to an output of the third sampler and a clock input coupled to receive a second one of the second clock signals.

15. The phase detection circuit of claim 13, wherein the first phase detector further comprises:
  a logic circuit having a clock input coupled to receive the first one of the second clock signals.

16. A receiver comprising a phase-detection circuit that comprises:
  a clock generator having a set of M outputs for providing a reference set of M matched clock signals, with $M>=2$;
  a first set of M buffers coupled to the set of M first outputs for providing a set of M first clock signals;
  a second set of M buffers coupled to the set of M outputs for providing a set of M second clock signals; and
  a first phase detector including first and second samplers and a first latch, with the first sampler having an input for receiving a first data signal and a clock input coupled to receive a first one of the first clock signals, the second sampler having an input for receiving the first data signal and a clock input coupled to receive the first one of the first clock signals, the first latch having a data input coupled to an output of the first sampler and a clock input coupled to receive a first one of the second clock signals.

17. A programmable integrated circuit comprising:
a receiver; and
at least one field-programmable logic device coupled to the receiver;
wherein the receiver comprises a phase-detection circuit comprising:
 a clock generator having a set of M outputs for providing a reference set of M matched clock signals, with M>=2;
 a first set of M buffers coupled to the set of M first outputs for providing a set of M first clock signals;
 a second set of M buffers coupled to the set of M outputs for providing a set of M second clock signals; and
 a first phase detector including first and second samplers and a first latch, with the first sampler having an input for receiving a first data signal and a clock input coupled to receive a first one of the first clock signals, the second sampler having an input for receiving the first data signal and a clock input coupled to receive the first one of the first clock signals, the first latch having a data input coupled to an output of the first sampler and a clock input coupled to receive a first one of the second clock signals.

18. A system comprising:
a programmable integrated circuit; and
a processor coupled to the programmable integrated circuit;
wherein the programmable integrated circuit comprises a receiver and at least one field-programmable logic device coupled to the receiver; and
wherein the receiver comprises a phase-detection circuit comprising:
 a clock generator having a set of M outputs for providing a reference set of M matched clock signals, with M>=2;
 a first set of M buffers coupled to the set of M first outputs for providing a set of M first clock signals;
 a second set of M buffers coupled to the set of M outputs for providing a set of M second clock signals; and
 a first phase detector including first and second samplers and a first latch, with the first sampler having an input for receiving a first data signal and a clock input coupled to receive a first one of the first clock signals, the second sampler having an input for receiving the first data signal and a clock input coupled to receive the first one of the first clock signals, the first latch having a data input coupled to an output of the first sampler and a clock input coupled to receive a first one of the second clock signals.

19. A method of distributing clock signals in a circuit, comprising:
providing a reference set of M matched clock signals to the circuit, with each clock signal in the first set being delayed a corresponding multiple of a nominal delay period relative to a given one of the clock signals;
deriving at least first and second sets of M matched clock signals from the reference set of M matched clock signals;
distributing at least first and second clock signals from the first set of matched clock signals to respective first and second substantially matched components in the circuit; and
distributing a first clock signal from the second set of matched clock signals to a third component in the circuit, with the third component having electrical characteristics substantially different from those of the first and second substantially matched components.

20. The method of claim 19, wherein each clock signal in the second set of matched clock signals is delayed a corresponding multiple of the nominal delay period relative to a given one of the clock signals in the second set; and wherein each clock signal in the third set of matched clock signals is delayed a corresponding multiple of the nominal delay period relative to a given one of the clock signals in the third set.

21. The method of claim 19, further comprising:
distributing third and fourth clock signals from the second set of matched clock signals to respective third and fourth components in the circuit, with the third and fourth components substantially matched to the first and second components.

22. The method of claim 19, further comprising distributing a second clock signal from the third set of matched clock signals to a fourth component having electrical characteristics substantially different from those of the first, second, and third components.

23. The method of claim 19, wherein deriving the second and third sets of M clocks from the first set of M matched clock signals, comprises:
providing first and second sets of M buffers; and
driving the first and second sets of M buffers with the first set of M matched clock signals.

24. The method of claim 19, wherein the first and second substantially identical components are samplers and the third component is a latch or a logic gate.

25. A transmitter circuit comprising:
 a clock-generation circuit for generating a reference set of matched clock signals, with each clock signal in the reference set being delayed a corresponding multiple of a nominal delay period relative to a given one of the matched clock signals;
 a first set of buffers for receiving the reference set of matched clock signals and outputting a set of first clock signals;
 a second set of buffers for receiving the reference set of matched clock signals and outputting a set of second clock signals; and
 a parallel-to-serial converter including:
  data-storage means coupled to receive two of more of the first clock signals; and
  switching means coupled to receive two or more of the second clock signals.

26. A programmable integrated circuit comprising:
a transmitter; and
at least one field-programmable logic device coupled to the transmitter;
wherein the transmitter circuit comprises:
 a clock-generation circuit for generating a reference set of matched clock signals, with each clock signal in the reference set being delayed a corresponding multiple of a nominal delay period relative to a given one of the matched clock signals;
 a first set of buffers for receiving the reference set of matched clock signals and outputting a set of first clock signals;
 a second set of buffers for receiving the reference set of matched clock signals and outputting a set of second clock signals; and a parallel-to-serial converter including:
  data-storage means coupled to receive two of more of the first clock-signals; and
  switching means coupled to receive two or more of the second clock signals.

27. A system comprising:
a programmable integrated circuit; and
a processor coupled to the programmable integrated circuit;
wherein the programmable integrated circuit comprises a transmitter and at least one field-programmable logic device coupled to the transmitter; and
wherein the transmitter comprises:
  a clock-generation circuit for generating a reference set of matched clock signals, with each clock signal in the reference set being delayed a corresponding multiple of a nominal delay period relative to a given one of the matched clock signals;
  a first set of buffers for receiving the reference set of matched clock signals and outputting a set of first clock signals;
  a second set of buffers for receiving the reference set of matched clock signals and outputting a set of second clock signals; and
  a parallel-to-serial converter including:
    data-storage means coupled to receive two of more of the first clock signals; and
    switching means coupled to receive two or more of the second clock signals.

28. A circuit for receiving and distributing a reference set of matched clock signals, with each clock signal in the reference set being delayed a corresponding multiple of a nominal delay period relative to a given one of the matched clock signals, the circuit comprising:
  a first set of buffers for receiving the reference set of matched clock signals and outputting a set of first clock signals;
  a second set of buffers for receiving the reference set of matched clock signals and outputting a set of second clock signals; and
  a first set of substantially matched components, each coupled to receive a respective one of the first clock signals; and
  a second set of components, each coupled to receive a respective one of the second clock signals.

29. The circuit of claim 28, wherein each of the first set of buffers have approximately the same drive capacity and each of the second set of buffers has a drive capacity different from that of the first set of buffers.

30. The circuit of claim 29, wherein each of the second set of buffers have approximately the same drive capacity.

31. The circuit of claim 28, wherein each of the second set of components has substantially different load characteristics than those of the first set of substantially matched components.

32. The circuit of claim 28, wherein the first and second set of components are integrated on a common substrate.

33. The circuit of claim 28, wherein each of the first set of components is a sampler or a multiplexer and each of the second set of components is neither a sampler nor a multiplexer.

34. A circuit which operates based on a reference set of matched clock signals, with each clock signal in the reference set being delayed a corresponding multiple of a nominal delay period relative to a given one of the reference set of clock signals, the circuit comprising:

a first set of substantially matched components, each coupled to receive a respective one of a set of first clock signals derived from the reference set of clock signals, with each first clock signal delayed a corresponding multiple of the nominal delay period relative to a given one of the first clock signals; and
a second set of components having load characteristics different from that of the first set of substantially matched components, each of the second set of components coupled to receive a respective one of a set of second clock signals derived from the reference set of clock signals, with each second clock signal delayed a corresponding multiple of the nominal delay period relative to a given one of the second clock signals.

35. The circuit of claim 34, wherein at least two or more of the components of the second set of components do not match each other.

36. A circuit comprising:
  a first set of two or more substantially matched buffers, each for receiving a respective one of a set of matched clock signals, with each clock signal delayed a corresponding multiple of a nominal delay period relative to a given one of the clock signals in the set;
  a second set of two or more substantially matched buffers, each for receiving a respective one of the set of matched clock signals and each having a different drive capacity than that of the buffers in the first set of substantially matched buffers;
  a first Set of substantially matched components, each coupled to an output of a respective one of the first set of buffers; and
  a second set of components, each coupled to an output of a respective one of the second set of buffers.

37. A system comprising:
first and second electronic devices configured for electrical communication with each other, each device including:
  clock-generation means for generating a reference set of matched clock signals, with each clock signal in the reference set being delayed a corresponding multiple of a nominal delay period relative to a given one of the clock signals;
  a first set of buffers having a set of clock inputs coupled to receive the reference set of matched clock signals and having a set of clock outputs for providing a set of first clock signals based on the reference set of matched clock signals;
  a second set of buffers having a set of clock outputs coupled to receive the reference set of matched clock signals and having a set of clock outputs for providing a set of second clock signals based on the reference set of matched clock signals; and
  a first subcircuit including:
    a first component having a clock input coupled to receive a first one of the first clock signals; and
    a second component having a clock input coupled to receive a first one of the second clock signals; and
  a second subcircuit substantially identical to the first subcircuit and including:
    a third component substantially identical to the first component and having a clock input coupled to receive a second one of the first clock signals; and
    a fourth component having a clock input coupled to receive a second one of the second clock signals.

38. The system of claim 37, wherein at least one of the first and second electronic devices comprises a field-programmable logic device.

39. The system of claim 37, wherein the first and second electronic devices are configured for wireline communications with each other.

40. The system of claim 37, wherein the first and third components in the first electronic device are each samplers, and the first and third components in the second electronic device are multiplexers.

* * * * *